US008655726B1

(12) United States Patent
Favero et al.

(10) Patent No.: US 8,655,726 B1
(45) Date of Patent: Feb. 18, 2014

(54) METHOD AND SYSTEM FOR DERIVING A CONSUMER'S SHOPPING HABITS

(75) Inventors: James Robert Del Favero, Mountain View, CA (US); Lisa Cohen Gevelber, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1694 days.

(21) Appl. No.: 11/782,097

(22) Filed: Jul. 24, 2007

(51) Int. Cl.
*G06Q 30/00* (2012.01)

(52) U.S. Cl.
USPC ............ 705/14.53; 705/14.4; 705/14.49; 705/14.66; 709/201; 701/213

(58) Field of Classification Search
USPC ............ 705/14.53, 14.4, 14.49, 14.66, 14; 709/201; 701/213
See application file for complete search history.

(56) References Cited

U.S. PATENT DOCUMENTS

| | | | |
|---|---|---|---|
| 6,341,353 B1 * | 1/2002 | Herman et al. ................. | 726/5 |
| 6,349,257 B1 * | 2/2002 | Liu et al. ..................... | 701/438 |
| 6,401,034 B1 * | 6/2002 | Kaplan et al. ................ | 701/416 |
| 7,752,067 B2 * | 7/2010 | Fotteler et al. ............... | 705/7.29 |
| 7,895,067 B2 * | 2/2011 | Ramakrishnan ............. | 705/7.11 |
| 7,925,547 B2 * | 4/2011 | Schirmacher et al. ....... | 705/26.9 |
| 7,937,286 B2 * | 5/2011 | Newman et al. ............. | 705/7.31 |
| 8,010,399 B1 * | 8/2011 | Bruce et al. .................. | 705/7.29 |
| 8,265,984 B2 * | 9/2012 | Bai et al. ...................... | 705/7.34 |
| 8,364,171 B2 * | 1/2013 | Busch .......................... | 455/456.1 |
| 2002/0138343 A1 * | 9/2002 | Weatherford et al. ........ | 705/14 |
| 2003/0033195 A1 * | 2/2003 | Bruce et al. .................. | 705/10 |
| 2003/0158844 A1 * | 8/2003 | Kramer et al. ............... | 707/6 |
| 2003/0182191 A1 * | 9/2003 | Oliver et al. ................. | 705/14 |
| 2004/0056101 A1 * | 3/2004 | Barkan et al. ............ | 235/472.03 |
| 2005/0108070 A1 * | 5/2005 | Kelly et al. .................. | 705/5 |
| 2006/0069606 A1 * | 3/2006 | Kaczkowski et al. ........ | 705/10 |
| 2006/0242011 A1 * | 10/2006 | Bell et al. ..................... | 705/14 |
| 2007/0050258 A1 * | 3/2007 | Dohse ........................... | 705/14 |
| 2007/0162341 A1 * | 7/2007 | McConnell et al. .......... | 705/14 |
| 2007/0198354 A1 * | 8/2007 | Senghore et al. ............. | 705/14 |
| 2008/0021950 A1 * | 1/2008 | Schirmacher et al. ....... | 709/201 |
| 2008/0059307 A1 * | 3/2008 | Fordyce, III et al. ......... | 705/14 |
| 2008/0103887 A1 * | 5/2008 | Oldham et al. ............... | 705/14 |
| 2008/0248815 A1 * | 10/2008 | Busch .......................... | 455/456.5 |
| 2008/0313092 A1 * | 12/2008 | Lanham et al. ............... | 705/80 |
| 2009/0281869 A1 * | 11/2009 | Bai et al. ...................... | 705/10 |

FOREIGN PATENT DOCUMENTS

WO          WO9924891      *  5/1999  ............ G06Q 30/00

* cited by examiner

*Primary Examiner* — Michael Bekerman
*Assistant Examiner* — Luis A Brown
(74) *Attorney, Agent, or Firm* — Hawley Troxell Ennis & Hawley LLP; Philip McKay; Sean P. Lewis (57) ABSTRACT

A method and system for deriving a consumer's shopping habits includes a process for deriving a consumer's shopping habits whereby data representing financial transactions conducted by a given consumer using one of more payment methods is obtained. Payee identification data for the payees associated with the financial transactions is then obtained/derived from the financial transactions data. The payees' identification data is then analyzed to determine each payee's geographic location. The data representing the geographic location of the various payees is then aggregated, mapped, and analyzed to derive a geographical shopping area for the consumer, i.e., to determine where the consumer does a significant amount of his or her shopping.

23 Claims, 3 Drawing Sheets

METHOD AND SYSTEM FOR DERIVING A CONSUMER'S SHOPPING HABITS

BACKGROUND

The average consumer tends to establish certain routines and practices, i.e., habits, associated with his or her daily activities. As one example, the average consumer typically has identifiable shopping habits, such as making the majority of their purchases from a set of retailers that are typically are located within a definable "local" geographical shopping area for the consumer. In addition, the average consumer, often does their shopping, and frequents their local geographical shopping area, or a portion of their local geographical shopping area, with identifiable regularity, i.e., the average consumer often does their shopping in a given category, such as groceries, on the same day(s) of the week, and often at about the same time. As an example, a given consumer may buy coffee from a given coffee vendor located in a specific mini-mall each weekday around 7 AM, frequent a specific sandwich shop in a commercial building 3 to 4 times a week around noon, buy groceries from the same supermarket each Sunday between 4 PM and 7 PM, and frequent a given movie theater in a specific mall about every other Saturday evening around 9 PM.

The ability to determine a given consumer's shopping habits, including the geographic shopping area frequented by the consumer for making purchases and the days of the week/times the consumer typically shops in an identified geographic shopping area is of considerable value to multiple parties including, but not limited to: retailers and/or business owners and/or sellers of services and products, who could use the consumer shopping habit information to try and target/attract consumer's known to frequent the vicinity of their stores and to determine optimal hours of operation; marketers, who could also use the consumer shopping habit information to try and target/attract consumer's in a given geographical shopping area and/or at a defined time; developers, who could use the consumer shopping habit information to determine commercial and/or residential property placement and use; retail chain owners, who could use the consumer shopping habit information to determine store placement, hours of operation, and use; and other parties associated with business and business development.

In light of the considerable value of consumer shopping habit information, it is not surprising that some methods for "predicting" a consumer's shopping habits are currently available. However, these currently available methods are typically highly generalized, static, and truly are "estimates" based on rather unsophisticated assumptions, rather than actual empirical data.

For instance, some currently available methods for defining a given consumer's geographic shopping area involve obtaining a given consumer's address, and/or zip code, and then mechanically "predicting" the consumer's geographic shopping area by projecting a predefined distance/radius from the consumer's address, and/or zip code, and sweeping out a circle, i.e., by declaring the area enclosed by a circle of a predefined radius, and centered on the consumer's residence and/or zip code location, to be the consumer's geographic shopping area. While this method has the appeal of simplicity, it often fails to accurately predict and/or reflect reality because this method fails to take into account several variables and/or realities such as: fastest routes to a shopping area that may dictate that, in terms of time, the closest shopping is a outside the predefined radius/area; convenience of multiple stores being at a single location such as a mall that may be outside the predefined radius/area, but that still save the consumer time by allowing a single trip and a single stop; physical limitations such as lakes, oceans, parks, developments, hills, and mountains that can make large portions of a statically predicted geographical shopping area unrealistic and, some cases, nonsensical; consumer preferences such as desirable and/or non-desirable neighborhoods and/or ethnic based neighborhoods for special shopping needs such as a city's Chinatown, little Italy, or other area having specialty shops and languages; and/or numerous other factors that often make currently available methods for defining a given consumer's geographic shopping area unreliable and/or unrealistic.

As another example, some currently available methods for defining a given consumer's shopping habits use highly generalized estimates to predict when a given consumer might conduct their shopping. These predictions often make very general assumptions such as shopping at malls will be done on the weekend, coffee will be purchased in the morning before 9 AM, and this all within the statically predicted geographic shopping area. As might be expected, these types of predictions often prove incorrect.

As a result of the situation discussed above, consumer shopping habit information is currently more guesswork than science. Therefore, this potentially very valuable source of data is currently not being utilized to it's full potential.

SUMMARY

In accordance with one embodiment, a method and system for deriving a consumer's shopping habits includes a process for deriving a consumer's shopping habits whereby, in one embodiment, data representing financial transactions conducted by a given consumer is obtained. In one embodiment, payee identification data for the payees associated with each of the financial transactions is then obtained/derived from the financial transactions data. The payees' identification data is then analyzed to determine each payee's geographic location. In one embodiment, data representing the geographic location of the various payees is then aggregated, mapped, and analyzed to derive a geographical shopping area for the consumer, i.e., to determine where the consumer does a significant amount of his or her shopping.

In one embodiment, the data representing financial transactions conducted by a given consumer includes data associated with financial transactions conducted using multiple payment methods to provide as complete a set of consumer shopping habit data, including multiple geographic locations of the payees and dates and times of purchases, as possible. For instance, in one embodiment, financial transaction data is obtained from, but not limited to, any of the following sources: banks; debit cards and/or accounts; credit unions; credit cards and/or accounts and/or credit card/account providers; asset accounts and/or asset account providers; or other financial resources, accounts and/or services used by a given consumer to pay for and/or conduct financial transactions.

In one embodiment, the data representing financial transactions conducted by a given consumer using one of more payment methods is obtained using a computing system implemented financial management system, such as a computing system implemented personal financial management system, that implements, includes, is accessed by, and/or is otherwise associated with the process for deriving a consumer's shopping habits disclosed herein. In one embodiment, the computing system implemented financial management system obtains financial transaction data, such as payee, payee location, payment amount, payment date, payment time etc., via communication with banks, credit card providers, debit card providers, asset accounts, or other financial institutions, using electronic data transfer systems such as the Open Financial Exchange (OFX) specification, Web Direct, or various systems for transferring financial transaction data.

In some embodiments, payee identification data for the payees associated with each of the financial transactions is then obtained from the financial transactions data and some, or all, of the payees' geographic locations are obtained directly from the payee identification data for the payee, i.e., the payee identification data includes the payee's address, or another form of geographic location data. In some embodiments, some, or all, of the payees' geographic locations are determined by obtaining the payee's identity and then matching the payee's identity to a geographic location from a payee location source, i.e., the geographic location of the identified payee is looked up using the payee's name, code, or other identification data.

In one embodiment, data representing the geographic locations of the identified payees is then aggregated, mapped, and analyzed to derive a geographical shopping area for the consumer. In one embodiment, the geographic location of a defined percentage of the identified payees is used to derive a geographical shopping area for the consumer. In one embodiment, the geographic locations of all the identified payees that are frequented a defined number of times is used to derive a geographical shopping area for the consumer. In one embodiment, the geographic locations of all the identified payees is used to derive a geographical shopping area for the consumer.

In one embodiment, the geographic locations of any defined subset of all the identified payees, or any parameters for determining a subset of all the identified payees, is/are used to derive a geographical shopping area for the consumer.

In one embodiment, the data representing financial transactions conducted by a given consumer using one of more payment methods includes data indicating the date and/or time of the financial transactions. In one embodiment, the data indicating the date and/or time of the financial transactions is also analyzed to identify the consumers shopping habits in terms of days of the week and/or times when the consumer frequents a given payee.

In one embodiment, the derived geographical shopping area for the consumer, along with, in one embodiment, any day and time data associated with one or more of the consumer's the specific financial transactions, is stored in a location/account associated with the consumer for use and/or data transfer to interested parties.

Using the method and system for deriving a consumer's shopping habits disclosed herein, a consumer's shopping habits, including the consumer's geographic shopping area and, in one embodiment, the consumer's temporal shopping habits, are derived/modeled using real data directly related to a given consumer. Consequently, using the method and system for deriving a consumer's shopping habits disclosed herein, a more realistic, and dynamic, model of a given consumer's shopping habits is provided.

In addition, using the method and system for deriving a consumer's shopping habits disclosed herein, a given consumer's financial transactions data is obtained from multiple sources representing all, or most of, a given consumer's means for making payments. Consequently, using the method and system for deriving a consumer's shopping habits disclosed herein, a more complete set of consumer financial transaction data is obtained than could typically be provided by analyzing any one source of financial transaction data. As a result, using the method and system for deriving a consumer's shopping habits disclosed herein, the derived consumer shopping habit data, including the derived geographical shopping area data, is based on more detailed and complete data so as to provide very accurate, and potentially up-to-date, consumer shopping habit models.

As discussed in more detail below, using the below embodiments, with little or no modification and/or user input, there is considerable flexibility, adaptability, and opportunity for customization to meet the specific needs of various users under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

For illustrative purposes, some embodiments are described herein within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, delivered from a website and/or web-based function, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

Figure 1:
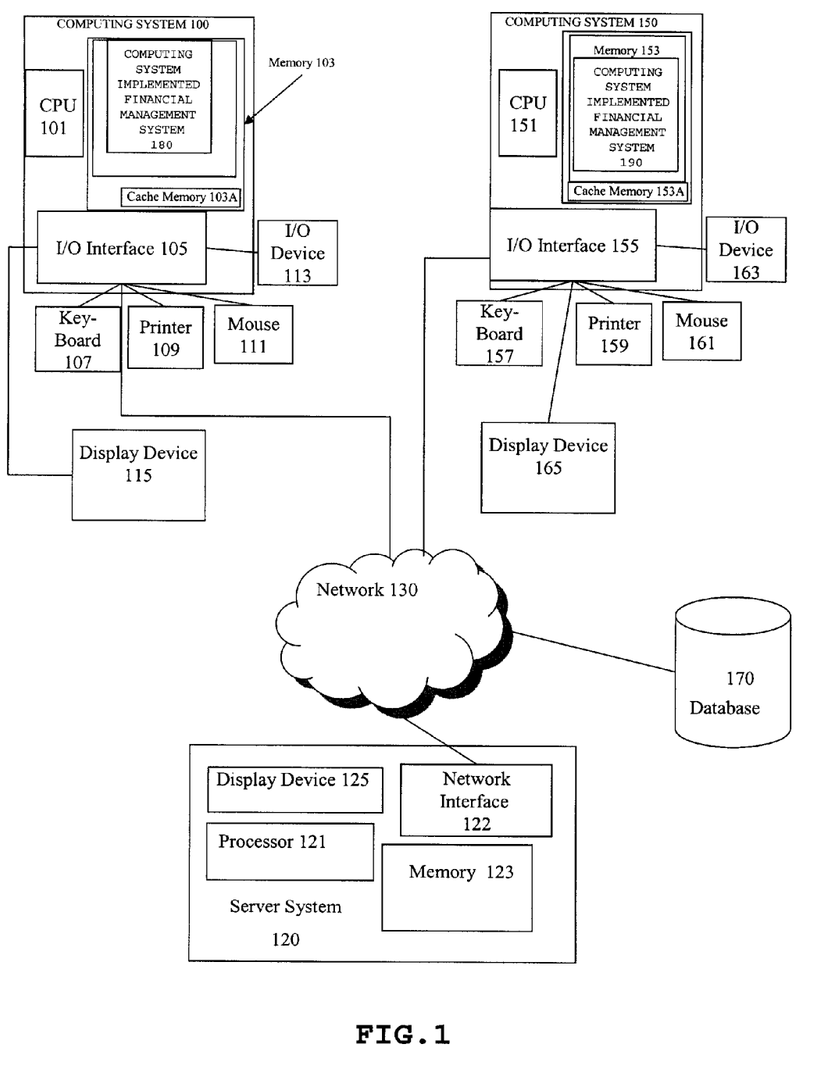
FIG. 1 is a block diagram of an exemplary hardware architecture for implementing one embodiment.

FIG. 1 is a block diagram of an exemplary hardware architecture for implementing one embodiment of a system and method for deriving a consumer's shopping habits, such as exemplary processes 200 and 300 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as, but not limited to: a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system. In one embodiment, computing system implemented financial management system 180 is stored, in whole, or in part, in memory system 103, and is used by, or includes, as discussed below, a process for deriving a consumer's shopping habits, such as exemplary processes 200 and 300 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for deriving a consumer's shopping habits and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 is a computing system used and/or accessible by another computing system, such as computing system 150 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for deriving a consumer's shopping habits, and/or a computing system implemented financial management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, memory system 153 includes all, or part of, a computing system implemented financial management system 190 such as, but not limited to: a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system.

As discussed in more detail below, in one embodiment, all, or part of, a process for deriving a consumer's shopping habits, and/or a computing system implemented financial management system, can be loaded, in whole, or in part, into computing system 150 from computing system 100 for storage in memory system 153 and/or cache memory 153A.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the user, and/or the user's agents, and/or a process for deriving a consumer's shopping habits, such as exemplary processes 200 and 300, and/or a computing system implemented process, such as a computing system implemented financial management system 180 and/or computing system implemented financial management system 190.

In one embodiment, database 170 is used, controlled, and/or accessible by, a provider of and/or a system and process for deriving a consumer's shopping habits, such as processes for deriving a consumer's shopping habits 200 and/or 300 and data representing all, or part, of a consumer's shopping habits is stored in database 170, typically in accounts associated with a given consumer. In one embodiment, database 170 is used, controlled, and/or accessible by, a provider of and/or a computing system implemented financial management system, such as a computing system implemented financial management system 180 and/or computing system implemented financial management system 190, and data representing all, or part, of a consumer's financial transaction data is stored in database 170, typically in accounts associated with a given consumer. In one embodiment, database 170 is used, controlled, and/or accessible by, one or more financial institutions and/or credit/debit account providers and data representing all, or part, of a consumer's financial transaction data is stored in database 170, typically in accounts associated with a given consumer.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for deriving a consumer's shopping habits, such as processes for deriving a consumer's shopping habits 200 and/or 300 and data representing all, or part, of a consumer's shopping habits is stored in or by server system 120, typically in accounts/locations associated with a given consumer. In one embodiment, server system 120 is used, controlled, and/or accessible by, a provider of and/or a computing system implemented financial management system, such as a computing system implemented financial management system 180 and/or computing system implemented financial management system 190, and data representing all, or part, of a consumer's financial transaction data is stored in or by server system 120, typically in accounts/locations associated with a given consumer.

In one embodiment, server system 120 is used, controlled, and/or accessible by, one or more financial institutions and/or credit/debit account providers and data representing all, or part, of a consumer's financial transaction data is stored in or by server system 120, typically in accounts/locations associated with a given consumer.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for deriving a consumer's shopping habits, such as processes for deriving a consumer's shopping habits 200 and/or 300, and/or a computing system implemented financial management system, such as a computing system implemented financial management system 180 and/or computing system implemented financial management system 190, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for deriving a consumer's shopping habits, such as processes for deriving a consumer's shopping habits 200 and/or 300, and/or a computing system implemented financial management system, such as computing system implemented financial management system 180 and/or computing system implemented financial management system 190, are sometimes referred to herein, alternatively, as a process, an application, a module, a program, a component of a software system, a component of a software package, a component of a parent system, a plug-in, or a feature of a parent system, this terminology is illustrative only. In some embodiments, a process for deriving a consumer's shopping habits, such as processes for deriving a consumer's shopping habits 200 and/or 300, and/or a computing system implemented financial management system, such as a computing system implemented financial management system 180 and/or computing system implemented financial management system 190, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for deriving a consumer's shopping habits, such as processes for deriving a consumer's shopping habits 200 and/or 300, and/or a computing system implemented financial management system, such as a computing system implemented financial management system 180 and/or computing system implemented financial management system 190, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

For example, all, or part, of a process for deriving a consumer's shopping habits, such as processes for deriving a consumer's shopping habits 200 and/or 300, and/or a computing system implemented financial management system, such as a computing system implemented financial management system 180 and/or computing system implemented financial management system 190, may be stored in a memory that is physically located in a location, such as server system memory 123, or database 170, of FIG. 1, different from a computing system, such as computing systems 100 and/or 150 of FIG. 1, utilizing a process for deriving a consumer's shopping habits, and/or a computing system implemented financial management system. In one embodiment, all, or part, of a process for deriving a consumer's shopping habits, and/or a computing system implemented financial management system, may be stored in a memory that is physically located, separate from the computing system's processor(s), such as CPUs 101 and 151 of FIG. 1, and the computing system CPUs can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for deriving a consumer's shopping habits, such as processes for deriving a consumer's shopping habits 200 and/or 300, and/or a computing system implemented financial management system, such as a computing system implemented financial management system 180 and/or computing system implemented financial management system 190, is a portable computer, a workstation, a two-way pager, a cellular telephone, a smart phone, a digital wireless telephone, a PDA, a server computer, an Internet appliance, or any other device that includes components that can execute all, or part, of a process for deriving a consumer's shopping habits, and/or a computing system implemented financial management system, in accordance with at least one of the embodiments as described herein. Similarly, in another embodiment, a process for deriving a consumer's shopping habits, and/or a computing system implemented financial management system, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "consumer", "individual", "user", and/or "customer" are used interchangeably to denote any party interfacing and/or interacting with a process for deriving a consumer's shopping habits, and/or a person who is the subject of all, or part of, any data/information obtained by a process for deriving a consumer's shopping habits, and/or a legal guardian of a person who is the subject of any data/information obtained by a process for deriving a consumer's shopping habits, and/or an authorized agent of any party interfacing and/or interacting with a process for deriving a consumer's shopping habits, and/or a person who is the subject of any information obtained by a process for deriving a consumer's shopping habits, and/or any other authorized party associated with any party interfacing and/or interacting with a process for deriving a consumer's shopping habits, and/or a person who is the subject of any information obtained by a process for deriving a consumer's shopping habits.

Herein, the terms "consumer's geographical shopping area", "geographical shopping area", "shopping area", "local shopping area", "consumer's local shopping area" and "consumer's shopping area" are used interchangeable to denote an area where a consumer conducts a defined percentage, or a defined type, of his or her shopping and/or financial transactions.

Herein, the term "consumer's shopping habits" denotes any identifiable patterns in a consumer's shopping activity, such as, but not limited to: a consumer's geographical shopping area; days of the week or dates when a consumer tends to do his or her shopping; times of day when a consumer tends to do his or her shopping; days of the week or dates when a consumer tends to shop in a particular geographic area; times of day when a consumer tends to shop in a particular geographic area; days of the week or dates when a consumer tends to frequent a particular store or type of store; times of day when a consumer tends to frequent a particular store or type of store; or any other identifiable pattern that indicates a consumer's shopping routine.

Herein, the terms "derived", "model" and "modeled" are used to denote a quantity and/or quality of data as being obtained, aggregated, and/or predicted based on historical data obtained by the process for deriving a consumer's shopping habits disclosed herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

In accordance with one embodiment, data representing financial transactions conducted by a given consumer using one of more payment methods is obtained by a process for deriving a consumer's shopping habits. In one embodiment, payee identification data for the payees associated with each of the financial transactions is then obtained from the financial transactions data. The payees' identification data is then analyzed to determine each payee's geographic location. In one embodiment, data representing the geographic location of the various payees is then aggregated, mapped, and analyzed to derive a geographical shopping area for the consumer, i.e., to determine where the consumer does a significant amount of his or her shopping.

Figure 2:
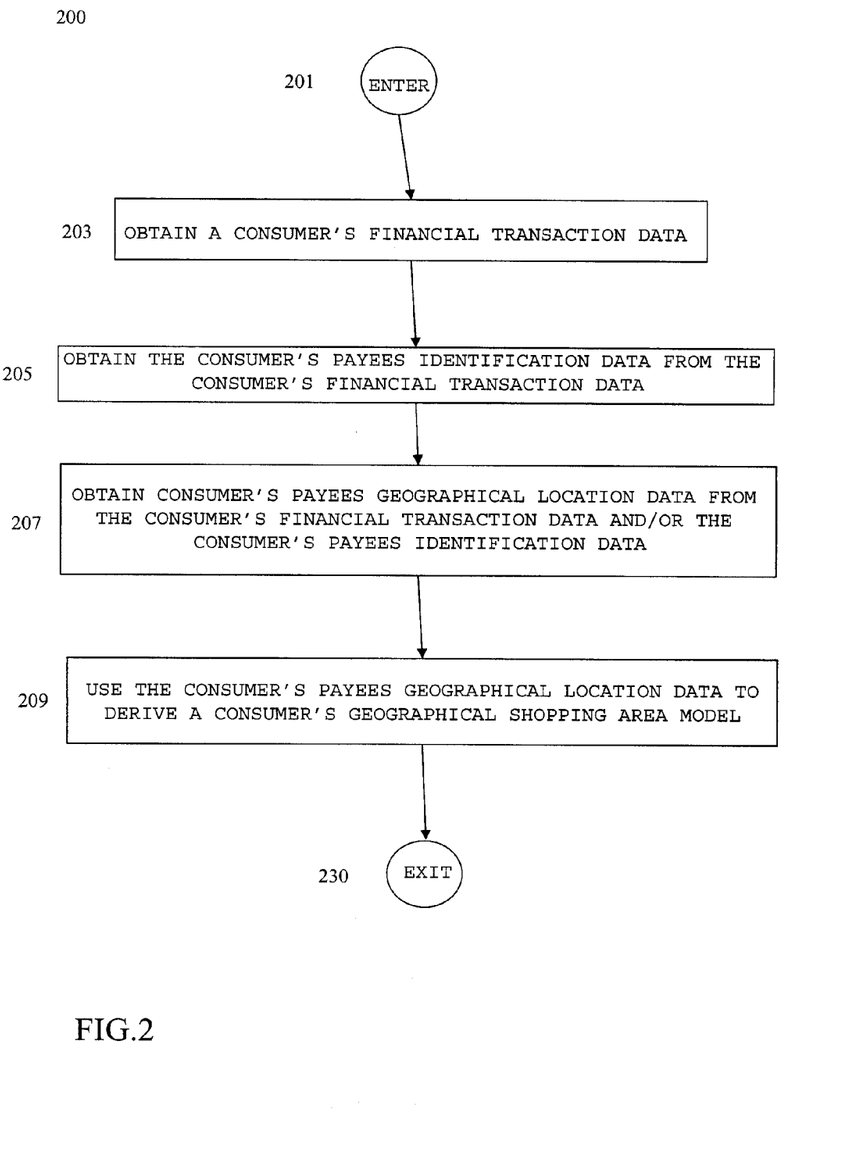
FIG. 2 is a flow chart depicting a process for deriving a consumer's shopping habits in accordance with one embodiment.

FIG. 2 a flow chart depicting a process for deriving a consumer's shopping habits 200 in accordance with one embodiment. Process for deriving a consumer's shopping habits 200 begins at ENTER OPERATION 201 of FIG. 2 and process flow proceeds to OBTAIN A CONSUMER'S FINANCIAL TRANSACTION DATA OPERATION 203.

In one embodiment, at OBTAIN A CONSUMER'S FINANCIAL TRANSACTION DATA OPERATION 203 data representing financial transactions conducted by a given consumer using one of more payment methods is obtained by process for deriving a consumer's shopping habits 200.

In one embodiment, the data representing financial transactions conducted by a given consumer obtained at OBTAIN A CONSUMER'S FINANCIAL TRANSACTION DATA OPERATION 203 includes data associated with financial transactions conducted using multiple payment methods to provide as complete a set of consumer shopping data, and geographic locations of the payees, as possible. For instance, in one embodiment, the consumer's financial transaction data is obtained at OBTAIN A CONSUMER'S FINANCIAL TRANSACTION DATA OPERATION 203 from, but not limited to, any one or more of the following sources: banks; debit cards and/or accounts; credit unions; credit cards and/or accounts and/or credit card/account providers; asset accounts and/or asset account providers; or other financial resources, accounts and/or services used by a consumer to pay for and/or conduct financial transactions.

In addition, in some embodiments, the consumer's financial transaction data obtained at OBTAIN A CONSUMER'S FINANCIAL TRANSACTION DATA OPERATION 203 is obtained from multiple sources of the same type. For instance, in one embodiment, the consumer's financial transaction data is obtained at OBTAIN A CONSUMER'S FINANCIAL TRANSACTION DATA OPERATION from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a consumer to pay for and/or conduct financial transactions.

In one embodiment, all, or part, of the consumer's financial transaction data is obtained by process for deriving a consumer's shopping habits 200 at OBTAIN A CONSUMER'S FINANCIAL TRANSACTION DATA OPERATION 203 from, or using, a computing system implemented financial management system, such as computing system implemented financial management system 180 and/or computing system implemented financial management system 190 (FIG. 1), that implements, includes, is accessed by, and/or is otherwise associated with process for deriving a consumer's shopping habits 200 (FIG. 2). In one embodiment, the computing system implemented financial management system is used to obtain financial transaction data representing various financial accounts, and specific financial transactions.

Currently, various computing system implemented financial management systems are available including: computing system implemented personal financial management systems; computing system implemented small business financial management systems; computing system implemented tax preparation systems; computing system implemented business accounting systems; and computing system implemented medical expense management systems; as well as various other electronic transaction data driven financial management systems.

Computing system implemented financial management systems help consumers/users manage their finances, by providing a centralized interface with banks, credit card companies, and other various financial institutions and/or accounts, for identifying, processing, storing, and categorizing user financial transactions. Currently, computing system implemented financial management systems typically obtain financial transaction information, such as payee identification, payee location, payment amount, date of the transaction, time of transaction, etc., via communication with banks, credit card providers, or other financial institutions, using electronic data transfer systems such as the Open Financial Exchange (OFX) specification, Web Direct, or various systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories.

In one embodiment, the consumer's financial transaction data obtained using one or more computing system implemented financial management systems is transferred, or otherwise made available to, process for deriving a consumer's shopping habits 200 at OBTAIN A CONSUMER'S FINANCIAL TRANSACTION DATA OPERATION 203.

In one embodiment, all, or part, of the consumer's financial transaction data is obtained by process for deriving a consumer's shopping habits 200 at OBTAIN A CONSUMER'S FINANCIAL TRANSACTION DATA OPERATION 203 from invoices/bills and/or receipt data provided to process for deriving a consumer's shopping habits 200, and or an associated computing system implemented financial management system, by one or more merchants and/or product and/or service providers.

As noted above, in one embodiment, process for deriving a consumer's shopping habits 200 is associated with a computing system implemented financial management system, such as computing system implemented financial management systems 180 and/or 190 of FIG. 1, that implements, includes, is accessed by, and/or is otherwise associated with process for deriving a consumer's shopping habits 200 (FIG. 2). Some of these computing system implemented financial management systems provide the capability to obtain, receive, and/or process electronic copies of the invoices/receipts from one or more merchants and/or product and/or service providers, often in their specific formats, and then store the data for use by process for deriving a consumer's shopping habits 200 in one of numerous locations by one of numerous methods known to those of skill in the art and/or as discussed herein.

In one embodiment, all, or part, of the consumer's financial transaction data is obtained by process for deriving a consumer's shopping habits 200 at OBTAIN A CONSUMER'S FINANCIAL TRANSACTION DATA OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions.

In one embodiment, all, or part, of the consumer's financial transaction data is obtained by process for deriving a consumer's shopping habits 200 at OBTAIN A CONSUMER'S FINANCIAL TRANSACTION DATA OPERATION 203 from user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, all, or part, of the consumer's financial transaction data is obtained by process for deriving a consumer's shopping habits 200 at OBTAIN A CONSUMER'S FINANCIAL TRANSACTION DATA OPERATION 203 from any combination of the above sources and/or from any other source of a consumer's financial transaction data whether known at the time of filing or as developed thereafter.

In one embodiment, once the consumer's financial transactions data is obtained at OBTAIN A CONSUMER'S FINANCIAL TRANSACTION DATA OPERATION 203, the data is stored in whole, or in part, in a database maintained by, accessible by, owned by, or otherwise related to: process for deriving a consumer's shopping habits 200, and/or a provider of process for deriving a consumer's shopping habits 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the consumer's financial transactions data stored as described above is maintained, in whole, or in part, by: process for deriving a consumer's shopping habits 200, and/or a provider of process for deriving a consumer's shopping habits 200; a computing system implemented financial management system, and/or a provider of a computing system implemented financial management system; a third party data storage institution; any third party service or institution; or any other parties. In these embodiments, access to the consumer's financial transactions data is then granted to process for deriving a consumer's shopping habits 200 by providing access to the data and/or providing the data on a computer program product.

In one embodiment, once data representing financial transactions conducted by a given consumer using one of more payment methods is obtained by process for deriving a consumer's shopping habits 200 at OBTAIN A CONSUMER'S FINANCIAL TRANSACTION DATA OPERATION 203, process flow proceeds to OBTAIN THE CONSUMER'S PAYEES IDENTIFICATION DATA FROM THE CONSUMER'S FINANCIAL TRANSACTION DATA OPERATION 205.

In one embodiment, at OBTAIN THE CONSUMER'S PAYEES IDENTIFICATION DATA FROM THE CONSUMER'S FINANCIAL TRANSACTION DATA OPERATION 205 payee identification data for the payees associated with each of the financial transactions of OBTAIN A CONSUMER'S FINANCIAL TRANSACTION DATA OPERATION 203 is obtained/derived from the financial transactions data of OBTAIN A CONSUMER'S FINANCIAL TRANSACTION DATA OPERATION 203.

As noted above, in one embodiment, the consumer's financial transaction data obtained at OBTAIN A CONSUMER'S FINANCIAL TRANSACTION DATA OPERATION 203 includes detailed transaction and payee data such as payee identification data, payee location data, payment amount data, date of the transaction data, time of the transaction data, etc. In one embodiment, at OBTAIN THE CONSUMER'S PAYEES IDENTIFICATION DATA FROM THE CONSUMER'S FINANCIAL TRANSACTION DATA OPERATION 205 payee data, such as payee identification data and/or payee location data, and/or date of the transaction data, and/or time of the transaction data, for the payees associated with each of the financial transactions is obtained from the financial transactions data.

In some embodiments, the payee identification data is provided as text data in the financial transaction data of OBTAIN A CONSUMER'S FINANCIAL TRANSACTION DATA OPERATION 203 and the payee identification data is directly read at OBTAIN THE CONSUMER'S PAYEES IDENTIFICATION DATA FROM THE CONSUMER'S FINANCIAL TRANSACTION DATA OPERATION 205. In other embodiments the payee identification data is coded and/or abbreviated and must be translated/interpreted by process for deriving a consumer's shopping habits 200 at OBTAIN THE CONSUMER'S PAYEES IDENTIFICATION DATA FROM THE CONSUMER'S FINANCIAL TRANSACTION DATA OPERATION 205 using look up tables, lists, and/or any other means, mechanisms, processes and/or procedures for translating/interpreting data. In one embodiment, the translations/interpretations means, mechanisms, processes and/or procedures use, or are based on, information provided to process for deriving a consumer's shopping habits 200 from any of the sources of information discussed herein and by any of the methods discussed herein, and/or known to those of skill in the art.

As noted above, in one embodiment, all, or part, of the consumer's financial transaction data is obtained by process for deriving a consumer's shopping habits 200 at OBTAIN A CONSUMER'S FINANCIAL TRANSACTION DATA OPERATION 203 from, or using, a computing system implemented financial management system, such as computing system implemented financial management system 180 and/or computing system implemented financial management system 190 (FIG. 1), that implements, includes, is accessed by, and/or is otherwise associated with process for deriving a consumer's shopping habits 200 (FIG. 2).

As also noted above, computing system implemented financial management systems typically obtain financial transaction data/information, such as payee identification, payee location, payment amount, date of the transaction, time of transaction, etc., via communication with banks, credit card providers, or other financial institutions, using electronic data transfer systems such as the Open Financial Exchange (OFX) specification, Web Direct, or various systems for transferring financial transaction data. Consequently, in some embodiments, the payee identification data is provided to process for deriving a consumer's shopping habits 200 at OBTAIN THE CONSUMER'S PAYEES IDENTIFICATION DATA FROM THE CONSUMER'S FINANCIAL TRANSACTION DATA OPERATION 205 from one or more computing system implemented financial management systems, typically after already having been translated/interpreted by one or more computing system implemented financial management system.

In one embodiment, at OBTAIN THE CONSUMER'S PAYEES IDENTIFICATION DATA FROM THE CONSUMER'S FINANCIAL TRANSACTION DATA OPERATION 205 an attempt is made to obtain payee data, such as payee identification data, payee location data, payment amount data, date of the transaction data, time of the transaction data, for each, or as many as possible, of the payees associated with each of the financial transactions in order to obtain as much payee identification data as possible.

In one embodiment, once payee identification data for as many of the payees associated with each of the financial transactions as possible is obtained/derived from the financial transactions data of OBTAIN A CONSUMER'S FINANCIAL TRANSACTION DATA OPERATION 203 at OBTAIN THE CONSUMER'S PAYEES IDENTIFICATION DATA FROM THE CONSUMER'S FINANCIAL TRANSACTION DATA OPERATION 205, process flow proceeds to OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207.

In one embodiment, at OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 the payees' identification data of OBTAIN THE CONSUMER'S PAYEES IDENTIFICATION DATA FROM THE CONSUMER'S FINANCIAL TRANSACTION DATA OPERATION 205 is analyzed to determine/extract/derive the consumer's payees' geographic locations.

In some embodiments, at OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 some, or all, of the payees' geographic locations are obtained directly from the payee identification data for the payee of OBTAIN THE CONSUMER'S PAYEES IDENTIFICATION DATA FROM THE CONSUMER'S FINANCIAL TRANSACTION DATA OPERATION 205, i.e., the payee identification data includes the payee's address or another form of geographic location data.

In some embodiments, some, or all, of the payees' geographic locations are determined by obtaining the payee's identity and then matching the payee's identity to a geographic location from a payee location source, i.e., the geographic location of the identified payee is looked up using the payee's name or other identification data. In these embodiments, any one of several means, mechanisms, processes and/or procedures for determining a payee's geographic location based on the payee's identity are used.

For instance, in one embodiment, an electronic telephone, or other business listing/directory, is used to match a payee's identity to a geographic location. In another embodiment, now readily available GPS applications and/or data is used to match a payee's identity to a geographic location. In another embodiment, now readily available digital map and/or business listing applications and/or data is used to match a payee's identity to a geographic location. In some embodiments, payee geographic location data is arranged in lists and/or tables and then used as a look up table, or other mapping function, to match a payee's identity to a geographic location.

In addition, in one embodiment, all, or part, of the consumer's financial transaction data is obtained by process for deriving a consumer's shopping habits 200 at OBTAIN A CONSUMER'S FINANCIAL TRANSACTION DATA OPERATION 203 from, or using, a computing system implemented financial management system, such as computing system implemented financial management system 180 and/or computing system implemented financial management system 190 (FIG. 1), that implements, includes, is accessed by, and/or is otherwise associated with process for deriving a consumer's shopping habits 200 (FIG. 2).

As also noted above, computing system implemented financial management systems typically obtain financial transaction data/information, such as payee identification, payee location, payment amount, date of the transaction, time of transaction, etc., via communication with banks, credit card providers, or other financial institutions, using electronic data transfer systems such as the Open Financial Exchange (OFX) specification, Web Direct, or various systems for transferring financial transaction data. Consequently, in some embodiments, the payee geographic location data is provided to process for deriving a consumer's shopping habits 200 at OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 from one or more computing system implemented financial management systems.

In one embodiment, at OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 an attempt is made to obtain payee data, such as payee identification data, payee location data, payment amount data, date of the transaction data, time of the transaction data, for each, or as many as possible, of the payees associated with each of the financial transactions in order to obtain as much payee geographic location data as possible.

In one embodiment, once the payees' identification data of OBTAIN THE CONSUMER'S PAYEES IDENTIFICATION DATA FROM THE CONSUMER'S FINANCIAL TRANSACTION DATA OPERATION 205 is analyzed to determine/extract/derive the payees' geographic locations at OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207, process flow proceeds to USE THE CONSUMER'S PAYEES GEOGRAPHICAL LOCATION DATA TO DERIVE A CONSUMER'S GEOGRAPHICAL SHOPPING AREA MODEL OPERATION 209.

In one embodiment, at USE THE CONSUMER'S PAYEES GEOGRAPHICAL LOCATION DATA TO DERIVE A CONSUMER'S GEOGRAPHICAL SHOPPING AREA MODEL OPERATION 209 the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 is aggregated, mapped, and analyzed to derive a geographical shopping area for the consumer, i.e., to determine where the consumer does a significant amount of his or her shopping.

In one embodiment, at USE THE CONSUMER'S PAYEES GEOGRAPHICAL LOCATION DATA TO DERIVE A CONSUMER'S GEOGRAPHICAL SHOPPING AREA MODEL OPERATION 209 the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 is collected and aggregated together for analysis of the entire set of payee geographic location data associated with the given consumer. As noted above, using process for deriving a consumer's shopping habits 200 a given consumer's financial transactions data is obtained from multiple sources representing all, or most of, a given consumer's means for making payments at OBTAIN A CONSUMER'S FINANCIAL TRANSACTION DATA OPERATION 203. Consequently, using process for deriving a consumer's shopping habits 200, a more complete set of consumer financial transaction data, and payee geographic location data, is obtained than could typically be provided by analyzing any one source of financial transaction data.

In one embodiment, at USE THE CONSUMER'S PAYEES GEOGRAPHICAL LOCATION DATA TO DERIVE A CONSUMER'S GEOGRAPHICAL SHOPPING AREA MODEL OPERATION 209 the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 is mapped using any one of several mapping and/or GPS related programs, applications, means, processes and/or procedure well known to those of skill in the art and/or a digital map or mapping application.

In one embodiment, at USE THE CONSUMER'S PAYEES GEOGRAPHICAL LOCATION DATA TO DERIVE A CONSUMER'S GEOGRAPHICAL SHOPPING AREA MODEL OPERATION 209 the geographic location of all of the identified payees is used to derive a geographical shopping area for the consumer. Consequently, in one embodiment, a geographical shopping area for the consumer is derived based on an area that contains all of the geographic locations of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207. In some, embodiments, statistical analysis is used to eliminate data anomalies and data points representing those outside the norm.

In one embodiment, at USE THE CONSUMER'S PAYEES GEOGRAPHICAL LOCATION DATA TO DERIVE A CONSUMER'S GEOGRAPHICAL SHOPPING AREA MODEL OPERATION 209 the geographic location of a defined percentage of the identified payees is used to derive a geographical shopping area for the consumer. Consequently, in one embodiment, a geographical shopping area for the consumer is derived based on an area that contains a predefined, or maximum, percentage of geographic locations of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207. In some embodiments, statistical analysis is used to eliminate data anomalies and data points representing those outside the norm.

In some embodiments, at USE THE CONSUMER'S PAYEES GEOGRAPHICAL LOCATION DATA TO DERIVE A CONSUMER'S GEOGRAPHICAL SHOPPING AREA MODEL OPERATION 209 only the geographic location of identified payees who appear more than a threshold number of times, and/or a threshold number of times over a defined time period, are used to derive a geographical shopping area for the consumer.

In some embodiments, at USE THE CONSUMER'S PAYEES GEOGRAPHICAL LOCATION DATA TO DERIVE A CONSUMER'S GEOGRAPHICAL SHOPPING AREA MODEL OPERATION 209 any combination of the above parameters is used to determine the set of identified payees that are used to derive a geographical shopping area for the consumer at USE THE CONSUMER'S PAYEES GEOGRAPHICAL LOCATION DATA TO DERIVE A CONSUMER'S GEOGRAPHICAL SHOPPING AREA MODEL OPERATION 209.

In some embodiments, at USE THE CONSUMER'S PAYEES GEOGRAPHICAL LOCATION DATA TO DERIVE A CONSUMER'S GEOGRAPHICAL SHOPPING AREA MODEL OPERATION 209 the parameters discussed above, and/or any other parameters, are defined by the provider of process for deriving a consumer's shopping habits 200, a user of the data from process for deriving a consumer's shopping habits 200, or any third party. These parameters can then be used, alone or in any combination, to determine the set of identified payees that are used to derive a geographical shopping area for the consumer at USE THE CONSUMER'S PAYEES GEOGRAPHICAL LOCATION DATA TO DERIVE A CONSUMER'S GEOGRAPHICAL SHOPPING AREA MODEL OPERATION 209.

In one embodiment, once the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 is aggregated, mapped, and analyzed to derive a geographical shopping area for the consumer at USE THE CONSUMER'S PAYEES GEOGRAPHICAL LOCATION DATA TO DERIVE A CONSUMER'S GEOGRAPHICAL SHOPPING AREA MODEL OPERATION 209, the data representing the derived geographical shopping area for the consumer is stored in whole, or in part, in a database maintained by, accessible by, owned by, or otherwise related to: process for deriving a consumer's shopping habits 200, and/or a provider of process for deriving a consumer's shopping habits 200; a computing system implemented financial management system, and/or a provider of a computing system implemented financial management system; and/or any other party, by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing system, such as computing system 100 described above. In one embodiment, the data, in whole, or in part, is stored in any computing system and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the consumer's financial transactions data stored as described above is maintained, in whole, or in part, by: process for deriving a consumer's shopping habits 200, and/or a provider of process for deriving a consumer's shopping habits 200; a computing system implemented financial management system, and/or a provider of a computing system implemented financial management system; a third party data storage institution; any third party service or institution; or any other parties. In these embodiments, access to the consumer's geographical shopping area data is then granted to other parties as desired by providing access to the data and/or providing the data on a computer program product.

In one embodiment, once the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 is aggregated, mapped, and analyzed to derive a geographical shopping area for the consumer at USE THE CONSUMER'S PAYEES GEOGRAPHICAL LOCATION DATA TO DERIVE A CONSUMER'S GEOGRAPHICAL SHOPPING AREA MODEL OPERATION 209, the data representing the geographical shopping area for the consumer can be provided to any party desiring the data, such as: retail business owners and/or sellers of services and products, who could use the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 to try and target/attract consumer's known to frequent the vicinity of their stores and to determine optimal hours of operation; marketers, who could use the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 to try and target/attract consumer's in given geographical shopping area and/or at a defined time; developers, who could use the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 to determine commercial and/or residential property placement and use; retail chain owners, who could use the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 to determine store placement, hours of operation, and use; and/or various other parties associated with business and business development.

In one embodiment, the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 is provided to other parties by providing the other parties access to the data on a database, such as database 170 of FIG. 1, a computing system, such as computing systems 100 and/or 150 of FIG. 1, and/or a server system, such as server computing system 120 of FIG. 1, on a web-site or other web-based system, and/or using a computer program product as defined herein.

Returning to FIG. 2, in one embodiment, the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 is provided to other parties through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in other embodiments, the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 is provided to other parties through e-mail or through text messaging. In other embodiments, the geographical shopping area data of USE THE CONSUMER'S PAYEES GEOGRAPHICAL LOCATION DATA TO DERIVE A CONSUMER'S GEOGRAPHICAL SHOPPING AREA MODEL OPERATION 209 is provided to other parties through any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, once the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207 is aggregated, mapped, and analyzed to derive a geographical shopping area for the consumer at USE THE CONSUMER'S PAYEES GEOGRAPHICAL LOCATION DATA TO DERIVE A CONSUMER'S GEOGRAPHICAL SHOPPING AREA MODEL OPERATION 209, process flow proceeds to EXIT OPERATION 230. In one embodiment, at EXIT OPERATION 230 process for deriving a consumer's shopping habits 200 is exited to await new data.

Using process for deriving a consumer's shopping habits 200, a consumer's shopping habits, including the consumer's geographic shopping area, is derived/modeled using real data directly related to a given consumer. Consequently, using process for deriving a consumer's shopping habits 200, a more realistic, and dynamic, model of a given consumer's shopping habits is provided.

In addition, using process for deriving a consumer's shopping habits 200, a given consumer's financial transactions data is obtained from multiple sources representing all, or most of, a given consumer's means for making payments. Consequently, using process for deriving a consumer's shopping habits 200, a more complete set of consumer financial transaction data is obtained than could typically be provided by analyzing any one source of financial transaction data. As result, using process for deriving a consumer's shopping habits 200, the derived consumer shopping habit data, including the derived geographical shopping area data, is based on more detailed and complete data so as to provide very accurate, and potentially up-to-date, consumer shopping habit models.

In one embodiment, the data representing financial transactions conducted by a given consumer using one of more payment methods also includes data indicating the date and/or time of the financial transactions. In one embodiment, the data indicating the date and/or time of the financial transactions is then also analyzed to identify the consumers shopping habits in temporal terms, such days of the week and/or times when the consumer frequents a given payee.

Figure 3:
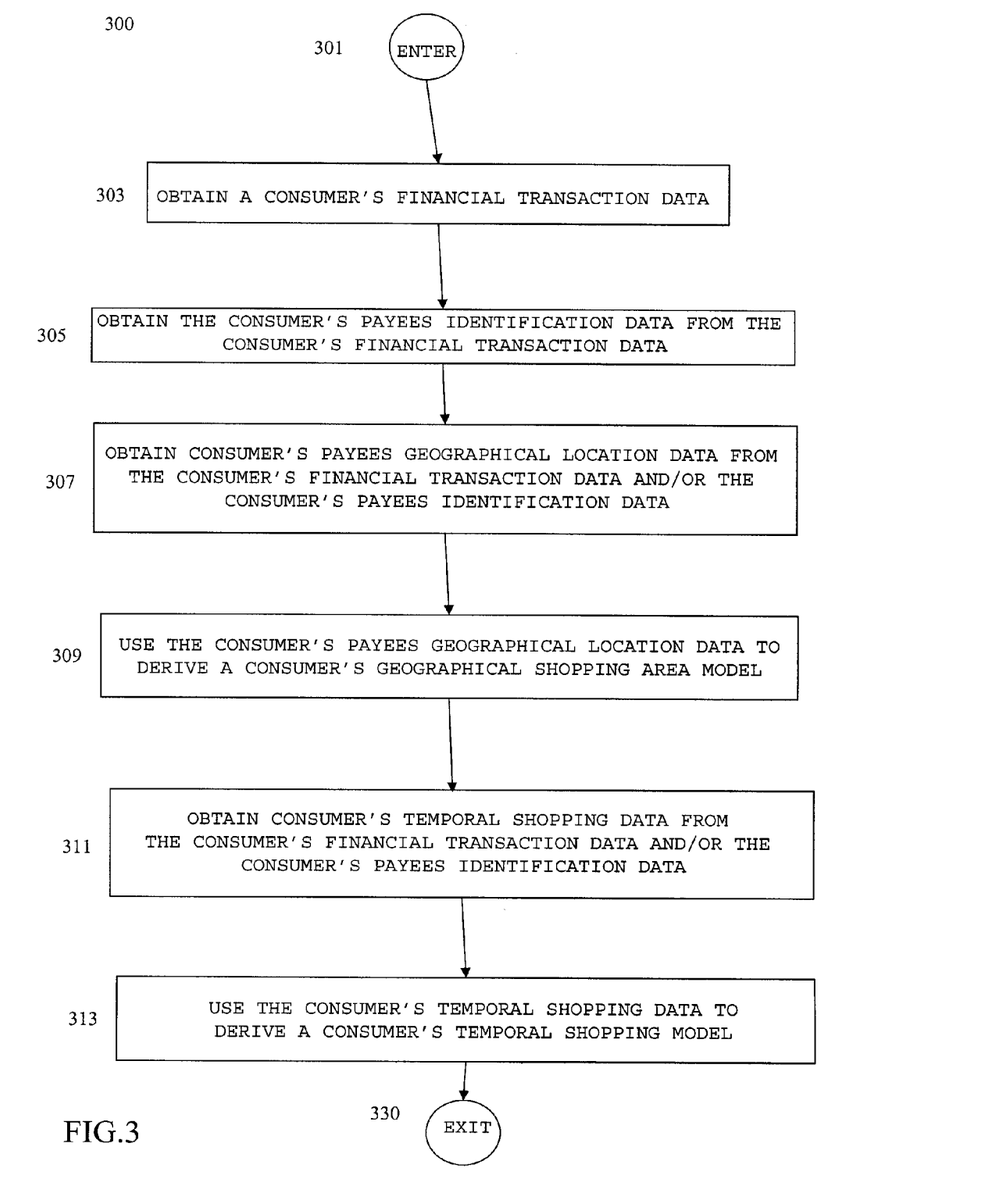
FIG. 3 is a flow chart depicting a process for deriving a consumer's shopping habits in accordance with one embodiment.

FIG. 3 a flow chart depicting a process for deriving a consumer's shopping habits 300 in accordance with one embodiment. Process for deriving a consumer's shopping habits 300 begins at ENTER OPERATION 301 of FIG. 3 and process flow proceeds to OBTAIN A CONSUMER'S FINANCIAL TRANSACTION DATA OPERATION 303.

In one embodiment: OBTAIN A CONSUMER'S FINANCIAL TRANSACTION DATA OPERATION 303; OBTAIN THE CONSUMER'S PAYEES IDENTIFICATION DATA FROM THE CONSUMER'S FINANCIAL TRANSACTION DATA OPERATION 305; OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 307; and USE THE CONSUMER'S PAYEES GEOGRAPHICAL LOCATION DATA TO DERIVE A CONSUMER'S GEOGRAPHICAL SHOPPING AREA MODEL OPERATION 309, of process for deriving a consumer's shopping habits 300 and FIG. 3 are substantially identical to similarly identified and numbered operations: OBTAIN A CONSUMER'S FINANCIAL TRANSACTION DATA OPERATION 203; OBTAIN THE CONSUMER'S PAYEES IDENTIFICATION DATA FROM THE CONSUMER'S FINANCIAL TRANSACTION DATA OPERATION 205; OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207; and USE THE CONSUMER'S PAYEES GEOGRAPHICAL LOCATION DATA TO DERIVE A CONSUMER'S GEOGRAPHICAL SHOPPING AREA MODEL OPERATION 209 of process for deriving a consumer's shopping habits 200 and FIG. 2.

Consequently, the discussion above with respect to: OBTAIN A CONSUMER'S FINANCIAL TRANSACTION DATA OPERATION 203; OBTAIN THE CONSUMER'S PAYEES IDENTIFICATION DATA FROM THE CONSUMER'S FINANCIAL TRANSACTION DATA OPERATION 205; OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 207; and USE THE CONSUMER'S PAYEES GEOGRAPHICAL LOCATION DATA TO DERIVE A CONSUMER'S GEOGRAPHICAL SHOPPING AREA MODEL OPERATION 209 of process for deriving a consumer's shopping habits 200 and FIG. 2 is applicable to, and incorporated here for: OBTAIN A CONSUMER'S FINANCIAL TRANSACTION DATA OPERATION 303; OBTAIN THE CONSUMER'S PAYEES IDENTIFICATION DATA FROM THE CONSUMER'S FINANCIAL TRANSACTION DATA OPERATION 305; OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 307; and USE THE CONSUMER'S PAYEES GEOGRAPHICAL LOCATION DATA TO DERIVE A CONSUMER'S GEOGRAPHICAL SHOPPING AREA MODEL OPERATION 309 of process for deriving a consumer's shopping habits 300 and FIG. 3.

In one embodiment, once the data representing the geographic location of the various payees from OBTAIN CONSUMER'S PAYEES GEOGRAPHICAL LOCATION DATA FROM THE CONSUMER'S FINANCIAL TRANSACTION DATA AND/OR THE CONSUMER'S PAYEES IDENTIFICATION DATA OPERATION 307 is aggregated, mapped, and analyzed to derive a geographical shopping area for the consumer at USE THE CONSUMER'S PAYEES GEOGRAPHICAL LOCATION DATA TO DERIVE A CONSUMER'S GEOGRAPHICAL SHOPPING AREA MODEL OPERATION 309, process flow proceeds to OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311.

In one embodiment at OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 the consumer's temporal shopping data indicating the date and/or time of the financial transactions of OBTAIN A CONSUMER'S FINANCIAL TRANSACTION DATA OPERATION 303 is obtained from the consumer's financial transaction data of OBTAIN A CONSUMER'S FINANCIAL TRANSACTION DATA OPERATION 303 and/or the payee identification data of OBTAIN THE CONSUMER'S PAYEES IDENTIFICATION DATA FROM THE CONSUMER'S FINANCIAL TRANSACTION DATA OPERATION 305.

As noted above, in one embodiment, the consumer's financial transaction data obtained at OBTAIN A CONSUMER'S FINANCIAL TRANSACTION DATA OPERATION 303 includes detailed transaction and payee data such as payee identification data, payee location data, payment amount data, date of the transaction data, time of the transaction data, etc. In one embodiment, at OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 temporal transaction data such as, but not limited to, the date of the transaction data and/or time of the transaction data for the financial transactions and payees associated with each of the financial transactions of OBTAIN A CONSUMER'S FINANCIAL TRANSACTION DATA OPERATION 203 is obtained from the financial transactions data.

As noted above, in one embodiment, all, or part, of the consumer's financial transaction data is obtained by process for deriving a consumer's shopping habits 300 at OBTAIN A CONSUMER'S FINANCIAL TRANSACTION DATA OPERATION 303 from, or using, a computing system implemented financial management system, such as computing system implemented financial management system 180 and/or computing system implemented financial management system 190 (FIG. 1), that implements, includes, is accessed by, and/or is otherwise associated with process for deriving a consumer's shopping habits 300 (FIG. 3).

As also noted above, computing system implemented financial management systems typically obtain financial transaction data/information, such as payee identification, payee location, payment amount, date of the transaction, time of transaction, etc., via communication with banks, credit card providers, or other financial institutions, using electronic data transfer systems such as the Open Financial Exchange (OFX) specification, Web Direct, or various systems for transferring financial transaction data. Consequently, in some embodiments, consumer's temporal shopping data is provided to process for deriving a consumer's shopping habits 300 at OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 from one or more computing system implemented financial management systems.

In one embodiment, at OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 an attempt is made to obtain consumer's temporal shopping data, such as date and/or time of a transaction data, for each, or as many as possible, of the financial transactions in order to obtain as much consumer's temporal shopping data as possible.

In one embodiment, once the consumer's temporal shopping data indicating the date and/or time of the financial transactions of OBTAIN A CONSUMER'S FINANCIAL TRANSACTION DATA OPERATION 303 is obtained from the consumer's financial transaction data of OBTAIN A CONSUMER'S FINANCIAL TRANSACTION DATA OPERATION 303 and/or the payee identification data of OBTAIN THE CONSUMER'S PAYEES IDENTIFICATION DATA FROM THE CONSUMER'S FINANCIAL TRANSACTION DATA OPERATION 305 at OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311, process flow proceeds to USE THE CONSUMER'S TEMPORAL SHOPPING DATA TO DERIVE A CONSUMER'S TEMPORAL SHOPPING MODEL OPERATION 313.

In one embodiment at USE THE CONSUMER'S TEMPORAL SHOPPING DATA TO DERIVE A CONSUMER'S TEMPORAL SHOPPING MODEL OPERATION 313 the consumer's temporal shopping data indicating the date and/or time of the financial transactions of OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 is analyzed to identify/derive the consumer's temporal shopping habits in terms of, but not limited to: days of the week or dates when a consumer tends to do his or her shopping; times of day when a consumer tends to do his or her shopping; days of the week or dates when a consumer tends to shop in a particular geographic area; times of day when a consumer tends to shop in a particular geographic area; days of the week or dates when a consumer tends to frequent a particular store or type of store; times of day when a consumer tends to frequent a particular store or type of store; or any other identifiable pattern that indicates the consumer's shopping routine in temporal terms.

In one embodiment, once the consumer's temporal shopping data indicating the date and/or time of the financial transactions of OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 is analyzed to identify/derive the consumer's temporal shopping habits in terms of, but not limited to: days of the week or dates when a consumer tends to do his or her shopping; times of day when a consumer tends to do his or her shopping; days of the week or dates when a consumer tends to shop in a particular geographic area; times of day when a consumer tends to shop in a particular geographic area; days of the week or dates when a consumer tends to frequent a particular store or type of store; times of day when a consumer tends to frequent a particular store or type of store; or any other identifiable pattern that indicates the consumer's shopping routine in temporal terms at USE THE CONSUMER'S TEMPORAL SHOPPING DATA TO DERIVE A CONSUMER'S TEMPORAL SHOPPING MODEL OPERATION 313, the data representing the identified/derived consumer's temporal shopping habits is stored and/or made available to other parties by any of the means, mechanisms, processes and/or procedures discussed herein and or known to those of skill in the art at the time of filing or as developed thereafter.

In one embodiment, once the consumer's temporal shopping data indicating the date and/or time of the financial transactions of OBTAIN CONSUMER'S TEMPORAL SHOPPING DATA FROM THE CONSUMER'S FINANCIAL TRANSACTION DATA AND/OR THE CONSUMER'S PAYEES IDENTIFICATION DATA OPERATION 311 is analyzed to identify/derive the consumer's temporal shopping habits in terms of, but not limited to: days of the week or dates when a consumer tends to do his or her shopping; times of day when a consumer tends to do his or her shopping; days of the week or dates when a consumer tends to shop in a particular geographic area; times of day when a consumer tends to shop in a particular geographic area; days of the week or dates when a consumer tends to frequent a particular store or type of store; times of day when a consumer tends to frequent a particular store or type of store; or any other identifiable pattern that indicates the consumer's shopping routine in temporal terms at USE THE CONSUMER'S TEMPORAL SHOPPING DATA TO DERIVE A CONSUMER'S TEMPORAL SHOPPING MODEL OPERATION 313, process flow proceeds to EXIT OPERATION 230. In one embodiment, at EXIT OPERATION 230 process for deriving a consumer's shopping habits 200 is exited to await new data.

Using process for deriving a consumer's shopping habits 300, a consumer's shopping habits, including the consumer's geographic shopping area and the consumer's temporal shopping habits, are derived/modeled using real data directly related to a given consumer. Consequently, using process for deriving a consumer's shopping habits 300, a more realistic, and dynamic, model of a given consumer's shopping habits is provided.

In addition, using processes for deriving a consumer's shopping habits 200 and 300, a given consumer's financial transactions data is obtained from multiple sources representing all, or most of, a given consumer's means for making payments. Consequently, using processes for deriving a consumer's shopping habits 200 and 300, a more complete set of consumer financial transaction data is obtained than could typically be provided by analyzing any one source of financial transaction data. As result, using processes for deriving a consumer's shopping habits 200 and 300, the derived consumer shopping habit data, including the derived geographical shopping area data, is based on more detailed and complete data so as to provide very accurate, and potentially up-to-date, consumer shopping habit models.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "accessing", "analyzing", "obtaining", "deriving", "determining", "collecting", "creating", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer program product for providing a process for deriving a consumer's shopping habits comprising:
   a nontransitory computer readable medium; and
   computer program code, encoded on the computer readable medium, comprising computer readable instructions for:
   obtaining consumer's financial transaction data from a bank and at least one other financial institution, the consumer's financial transaction data representing purchases made by the consumer, the consumer's financial transaction data representing one or more payments made by the consumer to each of two or more consumer payees from two or more payment sources and comprising at least the time and date of the payments made by the consumer to the payees;
   obtaining consumer's payees geographical location data from the consumer's financial transaction data, the consumer's payees geographical location data representing the geographical location of two or more payees of the two or more consumer payees;
   creating a derived geographical shopping area for the consumer from the consumer's payees geographical location data comprising at least time or date and visit frequency information of the consumer, the derived geographical shopping area being a geographical area that includes a predefined percentage of the consumer's payees, based on the obtained consumer's payees' geographical location;
   creating a model of the consumer's shopping habits, the model comprising at least time or date and visit frequency information of the consumer; and
   determining, by a retail seller of a product or service, at least one of optimum hours of operation or store placement, based on the derived shopping area for the consumer and the model of the consumer's shopping habits.

2. The computer program product for providing a process for deriving a consumer's shopping habits of claim 1, wherein;
obtaining the consumer's financial transaction data comprises obtaining at least part of the consumer's financial transaction data from one or more of the following sources:
a bank;
a debit card account;
a credit union; or
a credit card account.

3. The computer program product for providing a process for deriving a consumer's shopping habits of claim 1, wherein;
obtaining consumer's financial transaction data comprises obtaining at least part of the consumer's financial transaction data from a computing system implemented financial management system.

4. The computer program product for providing a process for deriving a consumer's shopping habits of claim 3, wherein;
the computing system implemented financial management system is a computing system implemented personal financial management system.

5. The computer program product for providing a process for deriving a consumer's shopping habits of claim 1, wherein;
obtaining the consumer's payees geographical location data from the consumer's financial transaction data comprises obtaining at least one consumer payee's identification data from the consumer's financial transaction data and matching the at least one consumer payee's identification data with a geographical location for the at least one consumer payee.

6. The computer program product for providing a process for deriving a consumer's shopping habits of claim 1, wherein;
creating a derived geographical shopping area for the consumer using the consumer's payees geographical location data comprises determining a geographical area that includes all of the consumer's payees geographical locations.

7. The computer program product for providing a process for deriving a consumer's shopping habits of claim 1, wherein;
creating a derived geographical shopping area for the consumer using the consumer's payees geographical location data comprises determining a geographical area that includes a set of the consumer's payees geographical locations, the set of the consumer's payees geographical locations being the consumer's payees geographical locations associated with consumer payees meeting defined criteria.

8. The computer program product for providing a process for deriving a consumer's shopping habits of claim 1, wherein;
creating a derived geographical shopping area for the consumer using the consumer's payees geographical location data comprises determining a geographical area that includes a set of the consumer's payees geographical locations, the set of the consumer's payees geographical locations being the consumer's payees geographical locations associated with consumer payees that appear as payees in the consumer's financial transaction data more than a threshold number of times.

9. The computer program product for providing a process for deriving a consumer's shopping habits of claim 1, wherein;
creating a derived geographical shopping area for the consumer using the consumer's payees geographical location data comprises determining a geographical area that includes a set of the consumer's payees geographical locations, the set of the consumer's payees geographical locations being the consumer's payees geographical locations associated with consumer payees that appear as payees in the consumer's financial transaction data more than a threshold number of times in a defined time period.

10. The computer program product for providing a process for deriving a consumer's shopping habits of claim 1, wherein;
the computer program code, encoded on the computer readable medium, further comprises;
computer readable instructions for:
obtaining consumer's temporal financial transaction data from the consumer's financial transaction data, the consumer's temporal financial transaction data representing the dates and/or times of one or more of the one or more payments made by the consumer to one or more consumer payees from one or more payment sources;
creating a derived consumer temporal shopping habits profile for the consumer using the consumer's temporal financial transaction data.

11. The computer program product for providing a process for deriving a consumer's shopping habits of claim 10, wherein;
the derived consumer temporal shopping habits profile for the consumer comprises one or more of the following:
days of the week when the consumer is likely to do his or her shopping;
times of day when the consumer is likely to do his or her shopping;
days of the week when the consumer is likely to be in a particular geographic area;
times of day when the consumer is likely to be in a particular geographic area;
days of the week when the consumer is likely to frequent a particular store; or
times of day when the consumer is likely to frequent a particular store.

12. A system for deriving a consumer's shopping habits comprising:
a processor; and
a memory coupled to the processor, the memory having instructions stored therein, which when executed by the processor perform a process for deriving a consumer's shopping habits comprising:
obtaining consumer's financial transaction data from a bank and at least one other financial institution, the consumer's financial transaction data representing purchases made by the consumer, the consumer's financial transaction data representing one or more payments made by the consumer to each of two or more consumer payees from two or more payment sources and comprising at least the time and date of the payments made by the consumer to the payees;
obtaining consumer's payees geographical location data from the consumer's financial transaction data, the consumer's payees geographical location data representing the geographical location of two or more payees of the two or more consumer payees;
creating a derived geographical shopping area for the consumer from the consumer's payees geographical location data comprising at least time or date and visit frequency information of the consumer, the derived geographical shopping area being a geographical area that includes a predefined percentage of the consumer's payees, based on the obtained consumer's payees' geographical location;

creating a model of the consumer's shopping habits, the model comprising at least time or date and visit frequency information of the consumer; and determining, by a retail seller of a product or service, at least one of optimum hours of operation or store placement, based on the derived shopping area for the consumer and the model of the consumer's shopping habits.

13. The system for deriving a consumer's shopping habits of claim 12, wherein:

obtaining the consumer's financial transaction data comprises obtaining at least part of the consumer's financial transaction data from one or more of the following sources:

a bank;

a debit card account;

a credit union; or a credit card account.

14. The system for deriving a consumer's shopping habits of claim 12, wherein:

the consumer's financial transaction data represents two or more payments made by the consumer to one or more consumer payees from two or more payment sources.

15. The system for deriving a consumer's shopping habits of claim 12, further comprising:

a computing system implemented financial management system, wherein;

obtaining consumer's financial transaction data comprises obtaining at least part of the consumer's financial transaction data from the computing system implemented financial management system.

16. The system for deriving a consumer's shopping habits of claim 15, wherein:

the computing system implemented financial management system is a computing system implemented personal financial management system.

17. The system for deriving a consumer's shopping habits of claim 12, wherein:

obtaining the consumer's payees geographical location data from the consumer's financial transaction data comprises obtaining at least one consumer payee's identification data from the consumer's financial transaction data and matching the at least one consumer payee's identification data with a geographical location for the at least one consumer payee.

18. The system for deriving a consumer's shopping habits of claim 12, wherein:

creating a derived geographical shopping area for the consumer using the consumer's payees geographical location data comprises determining a geographical area that includes all of the consumer's payees geographical locations.

19. The system for deriving a consumer's shopping habits of claim 12, wherein:

creating a derived geographical shopping area for the consumer using the consumer's payees geographical location data comprises determining a geographical area that includes a set of the consumer's payees geographical locations, the set of the consumer's payees geographical locations being the consumer's payees geographical locations associated with consumer payees meeting defined criteria.

20. The system for deriving a consumer's shopping habits of claim 12, wherein:

creating a derived geographical shopping area for the consumer using the consumer's payees geographical location data comprises determining a geographical area that includes a set of the consumer's payees geographical locations, the set of the consumer's payees geographical locations being the consumer's payees geographical locations associated with consumer payees that appear as payees in the consumer's financial transaction data more than a threshold number of times.

21. The system for deriving a consumer's shopping habits of claim 12, wherein:

creating a derived geographical shopping area for the consumer using the consumer's payees geographical location data comprises determining a geographical area that includes a set of the consumer's payees geographical locations, the set of the consumer's payees geographical locations being the consumer's payees geographical locations associated with consumer payees that appear as payees in the consumer's financial transaction data more than a threshold number of times in a defined time period.

22. The system for deriving a consumer's shopping habits of claim 12, wherein:

obtaining consumer's temporal financial transaction data from the consumer's financial transaction data, the consumer's temporal financial transaction data representing the dates and/or times of one or more of the one or more payments made by the consumer to one or more consumer payees from one or more payment sources;

creating a derived consumer temporal shopping habits profile for the consumer using the consumer's temporal financial transaction data.

23. The system for deriving a consumer's shopping habits of claim 22, wherein:

the derived consumer temporal shopping habits profile for the consumer comprises one or more of the following:

days of the week when the consumer is likely to do his or her shopping;

times of day when the consumer is likely to do his or her shopping;

days of the week when the consumer is likely to be in a particular geographic area;

times of day when the consumer is likely to be in a particular geographic area;

days of the week when the consumer is likely to frequent a particular store; or times of day when the consumer is likely to frequent a particular store.

\* \* \* \* \*